United States Patent
Yoshimine et al.

(12)
(10) Patent No.: US 9,786,933 B2
(45) Date of Patent: *Oct. 10, 2017

(54) FUEL CELL MODULE

(71) Applicant: HONDA MOTOR CO., LTD., Tokyo (JP)

(72) Inventors: Yuki Yoshimine, Wako (JP); Tetsuya Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

This patent is subject to a terminal disclaimer.

(21) Appl. No.: 14/784,189

(22) PCT Filed: Mar. 14, 2014

(86) PCT No.: PCT/JP2014/057946
§ 371 (c)(1),
(2) Date: Oct. 13, 2015

(87) PCT Pub. No.: WO2014/171265
PCT Pub. Date: Oct. 23, 2014

(65) Prior Publication Data
US 2016/0056486 A1 Feb. 25, 2016

(30) Foreign Application Priority Data
Apr. 18, 2013 (JP) .................. 2013-087806

(51) Int. Cl.
H01M 8/04 (2016.01)
H01M 8/04291 (2016.01)
H01M 8/0612 (2016.01)
H01M 8/04014 (2016.01)
H01M 8/04007 (2016.01)
H01M 8/04119 (2016.01)
(Continued)

(52) U.S. Cl.
CPC ... H01M 8/04291 (2013.01); H01M 8/04022 (2013.01); H01M 8/04074 (2013.01);
(Continued)

(58) Field of Classification Search
CPC .......... H01M 8/04291; H01M 8/2425; H01M 8/04164; H01M 8/1246; H01M 8/0625;
(Continued)

(56) References Cited

U.S. PATENT DOCUMENTS 6,379,829 B1 * 4/2002 Kurita ............... H01M 8/04089
429/423
6,531,102 B1 * 3/2003 Nakamura ............. B01B 1/005
422/198

(Continued)

FOREIGN PATENT DOCUMENTS

JP 2001-236980 8/2001
JP 2004-059415 2/2004
(Continued)

OTHER PUBLICATIONS

This case is co-pending with U.S. Appl. No. 14/784,183, filed Oct. 13, 2015 and U.S. Appl. No. 14/784,166, filed Oct. 13, 2015.
(Continued)

*Primary Examiner* — Lisa S Park
(74) *Attorney, Agent, or Firm* — Rankin, Hill & Clark LLP

(57) ABSTRACT

A fuel cell module includes a first area where an exhaust gas combustor and a start-up combustor are provided, a second area where a reformer and a heat exchanger are provided, a third area where an evaporator is provided, and a condensed water recovery mechanism for recovering condensed water produced by condensation of water vapor contained in the combustion gas by allowing the condensed water to flow from the third area to the second area and then flow from the second area to the first area.

11 Claims, 14 Drawing Sheets

(51) Int. Cl.
H01M 8/1246 (2016.01)
H01M 8/2425 (2016.01)
H01M 8/124 (2016.01)

(52) U.S. Cl.
CPC ..... *H01M 8/04164* (2013.01); *H01M 8/0612* (2013.01); *H01M 8/0625* (2013.01); *H01M 8/1246* (2013.01); *H01M 8/2425* (2013.01); *H01M 2008/1293* (2013.01)

(58) Field of Classification Search
CPC ........... H01M 8/0612; H01M 8/04022; H01M 8/04074; H01M 2008/1293
See application file for complete search history.

(56) References Cited

U.S. PATENT DOCUMENTS

| 9,406,950 | B2* | 8/2016 | Ogawa | .................... C01B 3/384 |
| 2001/0009732 | A1 | 7/2001 | Schuler | |
| 2009/0208800 | A1* | 8/2009 | Ogawa | .............. H01M 8/04022 |
| | | | | 429/411 |
| 2010/0021784 | A1 | 1/2010 | Fourmigue | |
| 2015/0288017 | A1 | 10/2015 | Yoshimine | |

FOREIGN PATENT DOCUMENTS

| JP | 2004-288434 | | 10/2004 |
| JP | 2008-063193 | | 3/2008 |
| JP | 2010-504607 | | 2/2010 |
| JP | 2014-096207 | | 5/2014 |
| WO | 2013/114773 | A1 | 8/2013 |
| WO | 2013/114775 | A1 | 8/2013 |
| WO | 2013/187153 | A1 | 12/2013 |
| WO | 2013/187154 | A1 | 12/2013 |

OTHER PUBLICATIONS

International Search Report, Date of mailing: Jun. 16, 2014.

* cited by examiner

FUEL CELL MODULE

TECHNICAL FIELD

The present invention relates to a fuel cell module including a fuel cell stack formed by stacking a plurality of fuel cells for generating electricity by electrochemical reactions of a fuel gas and an oxygen-containing gas.

BACKGROUND ART

Typically, a solid oxide fuel cell (SOFC) employs a solid electrolyte of ion-conductive solid oxide such as stabilized zirconia. An anode is provided on one side of the solid electrolyte, and a cathode is provided on the other side of the solid electrolyte to form an electrolyte electrode assembly (MEA). The electrolyte electrode assembly is sandwiched between separators (bipolar plates) to form a fuel cell. In use, generally, predetermined numbers of the electrolyte electrode assemblies and the separators are stacked together to form a fuel cell stack.

As a system including this fuel cell stack, for example, a fuel cell battery disclosed in Japanese Laid-Open Patent Publication No. 2001-236980 (hereinafter referred to as the conventional technique 1) is known. As shown in FIG. 12, the fuel cell battery includes a fuel cell stack 1a, and a heat insulating sleeve 2a is provided at one end of the fuel cell stack 1a. A reaction device 4a is provided in the heat insulating sleeve 2a. The reaction device 4a includes a heat exchanger 3a.

In the reaction device 4a, as a treatment of liquid fuel, partial oxidation reforming which does not use water is performed. After the liquid fuel is evaporated by an exhaust gas, the liquid fuel passes through a feeding point 5a which is part of the heat exchanger 3a. The fuel contacts an oxygen carrier gas heated by the exhaust gas to induce partial oxidation reforming, and then, the fuel is supplied to the fuel cell stack 1a.

Further, as shown in FIG. 13, a solid oxide fuel cell disclosed in Japanese Laid-Open Patent Publication No. 2010-504607 (PCT) (hereinafter referred to as the conventional technique 2) has a heat exchanger 2b including a cell core 1b. The heat exchanger 2b heats the cathode air utilizing waste heat.

Further, as shown in FIG. 14, a fuel cell system disclosed in Japanese Laid-Open Patent Publication No. 2004-288434 (hereinafter referred to as the conventional technique 3) includes a first area 1c having a cylindrical shape extending vertically, an annular second area 2c around the first area 1c, an annular third area 3c around the second area 2c, and an annular fourth area 4c around the third area 3c.

A burner 5c is provided in the first area 1c, and a reforming pipe 6c is provided in the second area 2c. A water evaporator 7c is provided in the third area 3c, and a CO shift converter 8c is provided in the fourth area 4c.

SUMMARY OF INVENTION

In the conventional technique 1, at the time of reforming by partial oxidation in the reaction device 4a, heat of the exhaust gas is used for heating the liquid fuel and the oxygen carrier gas. Therefore, the quantity of heat energy for heating the oxygen-containing gas supplied to the fuel cell stack 1a tends to be insufficient, and the efficiency is low.

Further, since the temperature of the exhaust gas gradually gets lower toward the outside of the reaction device 4a, the water vapor in the exhaust gas is cooled to cause water condensation, and the condensed water tends to be produced easily. Consequently, the condensed water is retained in the reaction device 4a as stagnant water, and degradation of the equipment occurs.

Further, in the conventional technique 2, long flow channels are adopted to have the sufficient heat transmission area. Therefore, considerably large pressure losses tend to occur. Further, treatment of the condensed water becomes difficult, and the condensed water tends to be retained in the apparatus easily. Consequently, degradation of the equipment occurs due to the condensed water.

Further, in the conventional technique 3, radiation of the heat from the central area having the highest temperature is suppressed using heat insulation material (partition wall). Therefore, heat cannot be collected (recovered), and the efficiency is low. Further, treatment of the condensed water becomes difficult, and the condensed water tends to be retained in the apparatus easily. Consequently, degradation of the equipment occurs due to the condensed water.

The present invention has been made to solve the problems of this type, and an object of the present invention is to provide a fuel cell module having simple and compact structure in which it is possible to achieve improvement in the heat efficiency and facilitate thermally self-sustaining operation, and also to recover condensed water reliably.

The present invention relates to a fuel cell module including a fuel cell stack formed by stacking a plurality of fuel cells for generating electricity by electrochemical reactions of a fuel gas and an oxygen-containing gas, a reformer for reforming a mixed gas of a raw fuel chiefly containing hydrocarbon and water vapor to produce the fuel gas supplied to the fuel cell stack, an evaporator for evaporating water, and supplying the water vapor to the reformer, a heat exchanger for raising the temperature of the oxygen-containing gas by heat exchange with a combustion gas, and supplying the oxygen-containing gas to the fuel cell stack, an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas, and a start-up combustor for combusting the raw fuel and the oxygen-containing gas to produce the combustion gas.

This fuel cell module includes a first area where the exhaust gas combustor and the start-up combustor are provided, an annular second area around the first area and where the reformer and the heat exchanger are provided, an annular third area around the second area and where the evaporator is provided, and a condensed water recovery mechanism for recovering condensed water produced by condensation of water vapor contained in the combustion gas by causing the condensed water to flow from the third area to the second area and then flow from the second area to the first area.

In the present invention, the first area in which the exhaust gas combustor and the start-up combustor are provided is positioned at the center. The annular second area is provided around the first area, and the annular third area is provided around the second area, successively. The reformer and the heat exchanger are provided in the second area, and the evaporator is provided in the third area.

In the structure, generation of the waste heat and heat radiation are suppressed suitably, improvement in the heat efficiency is achieved, and thermally self-sustaining operation can be facilitated. Further, simple and compact structure of the fuel cell module as a whole can be achieved. Thermally self-sustaining operation herein means operation where the operating temperature of the fuel cell is maintained using only heat energy generated in the fuel cell itself, without supplying additional heat from the outside.

Further, by providing the condensed water recovery mechanism, the condensed water produced by condensation of water vapor in the combustion gas can flow from the third area to the second area, and then, flow from the second area to the first area, i.e., from the low temperature side to the high temperature side. Therefore, transition of the condensed water again into the gas phase is facilitated. Thus, the condensed water is not retained in the FC peripheral equipment. Accordingly, the influence on the durability of the FC peripheral equipment is suppressed as much as possible, and it becomes possible to use the recovered condensed water as the water vapor for reforming.

DESCRIPTION OF EMBODIMENTS

Figure 1:
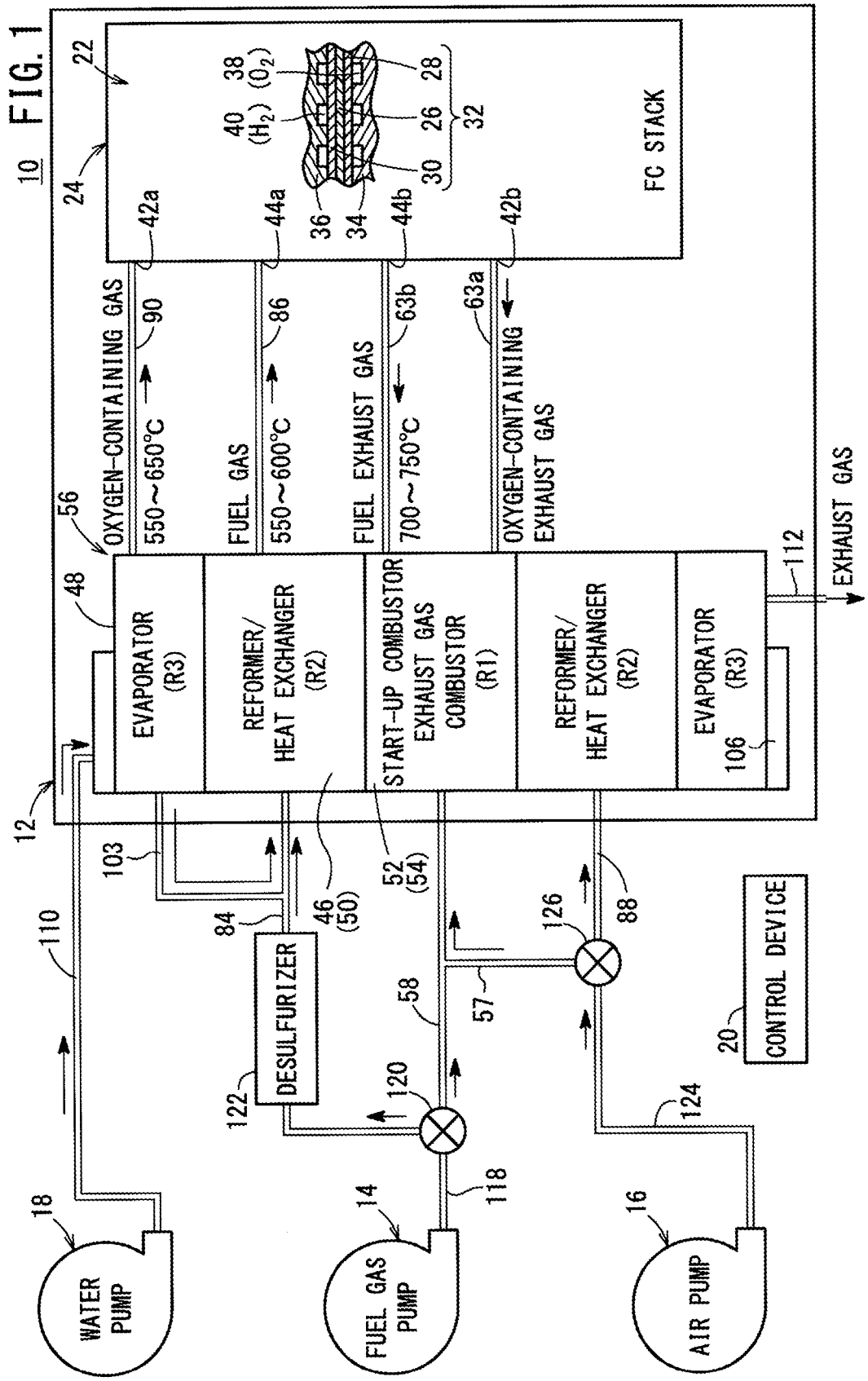
FIG. 1 is a diagram schematically showing structure of a fuel cell system including a fuel cell module according to a first embodiment of the present invention.

As shown in FIG. 1, a fuel cell system 10 includes a fuel cell module 12 according to a first embodiment of the present invention, and the fuel cell system 10 is used in various applications, including stationary and mobile applications. For example, the fuel cell system 10 is mounted on a vehicle.

The fuel cell system 10 includes the fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy generated in the fuel cell module 12.

The fuel cell module 12 includes a solid oxide fuel cell stack 24 formed by stacking a plurality of solid oxide fuel cells 22 in a vertical direction (or horizontal direction). The fuel cell 22 includes an electrolyte electrode assembly (MEA) 32. The electrolyte electrode assembly 32 includes a cathode 28, an anode 30, and an electrolyte 26 interposed between the cathode 28 and the anode 30. For example, the electrolyte 26 is made of ion-conductive solid oxide such as stabilized zirconia.

A cathode side separator 34 and an anode side separator 36 are provided on both sides of the electrolyte electrode assembly 32. An oxygen-containing gas flow field 38 for supplying the oxygen-containing gas to the cathode 28 is formed in the cathode side separator 34, and a fuel gas flow field 40 for supplying the fuel gas to the anode 30 is formed in the anode side separator 36. As the fuel cell 22, various types of conventional SOFCs can be adopted.

The operating temperature of the fuel cell 22 is high, at several hundred ° C. Methane in the fuel gas is reformed at the anode 30 to obtain hydrogen and CO, and the hydrogen and CO are supplied to a portion of the electrolyte 26 that faces the anode 30.

An oxygen-containing gas supply passage 42a, an oxygen-containing gas discharge passage 42b, a fuel gas supply passage 44a, and a fuel gas discharge passage 44b extend through the fuel cell stack 24. The oxygen-containing gas supply passage 42a is connected to an inlet of each oxygen-containing gas flow field 38, the oxygen-containing gas discharge passage 42b is connected to an outlet of each oxygen-containing gas flow field 38, the fuel gas supply passage 44a is connected to an inlet of each fuel gas flow field 40, and the fuel gas discharge passage 44b is connected to an outlet of each fuel gas flow field 40.

The fuel cell module 12 includes a reformer 46 for reforming a mixed gas of a raw fuel (e.g., city gas) chiefly containing hydrocarbon, and water vapor to produce a fuel gas supplied to the fuel cell stack 24, an evaporator 48 for evaporating water and supplying the water vapor to the reformer 46, a heat exchanger 50 for raising the temperature of the oxygen-containing gas by heat exchange with a combustion gas, and supplying the oxygen-containing gas to the fuel cell stack 24, an exhaust gas combustor 52 for combusting the fuel gas discharged from the fuel cell stack 24 as a fuel exhaust gas and the oxygen-containing gas discharged from the fuel cell stack 24 as an oxygen-containing exhaust gas to produce the combustion gas, and a start-up combustor 54 for combusting the raw fuel and the oxygen-containing gas to produce the combustion gas.

Figure 2:
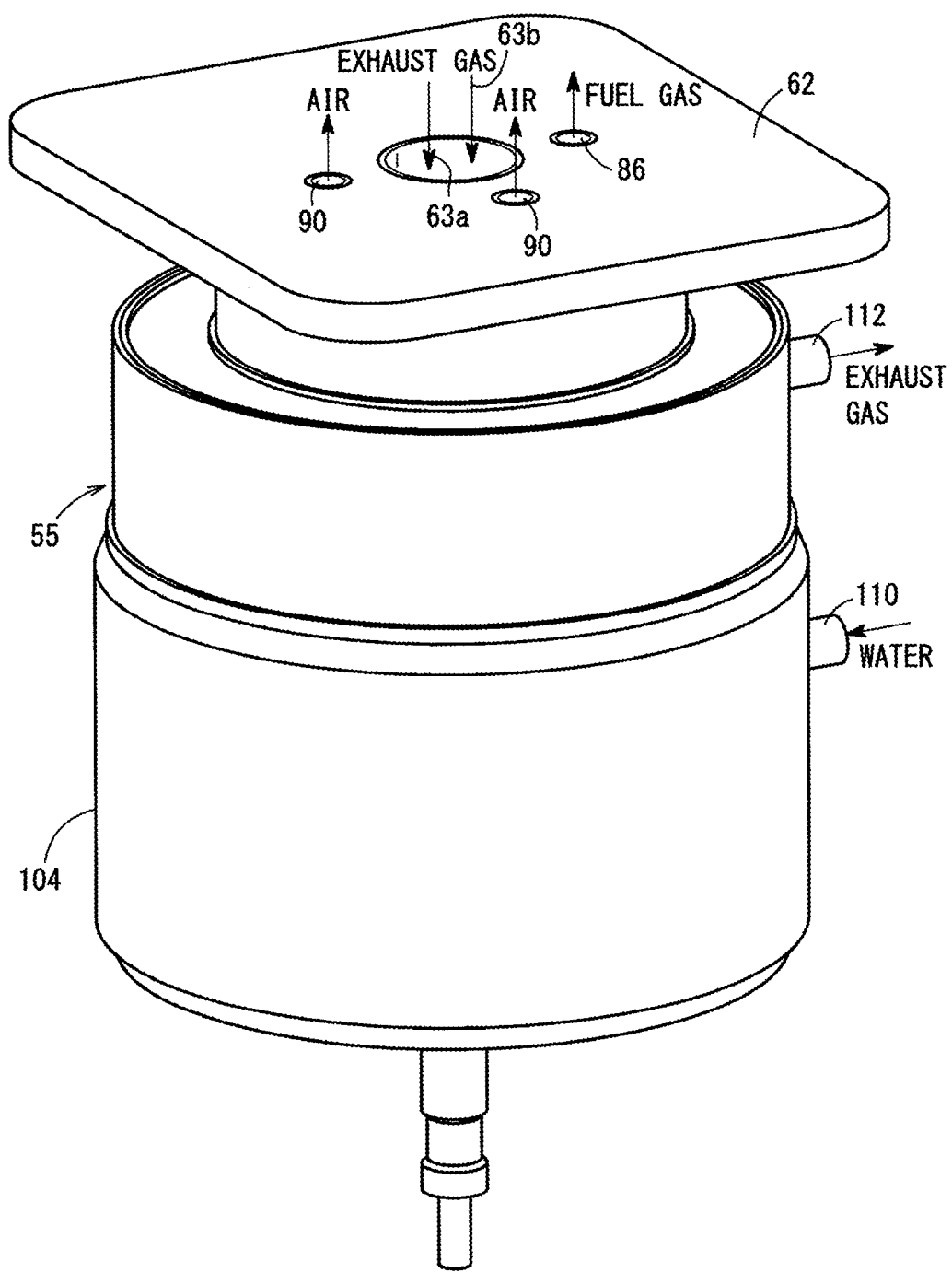
FIG. 2 is a perspective view showing FC peripheral equipment of the fuel cell module.

Basically, the fuel cell module 12 is made up of the fuel cell stack 24 and FC (fuel cell) peripheral equipment (BOP) 56 (see FIGS. 1 and 2). The FC peripheral equipment 56 includes the reformer 46, the evaporator 48, the heat exchanger 50, the exhaust gas combustor 52, and the start-up combustor 54.

Figure 3:
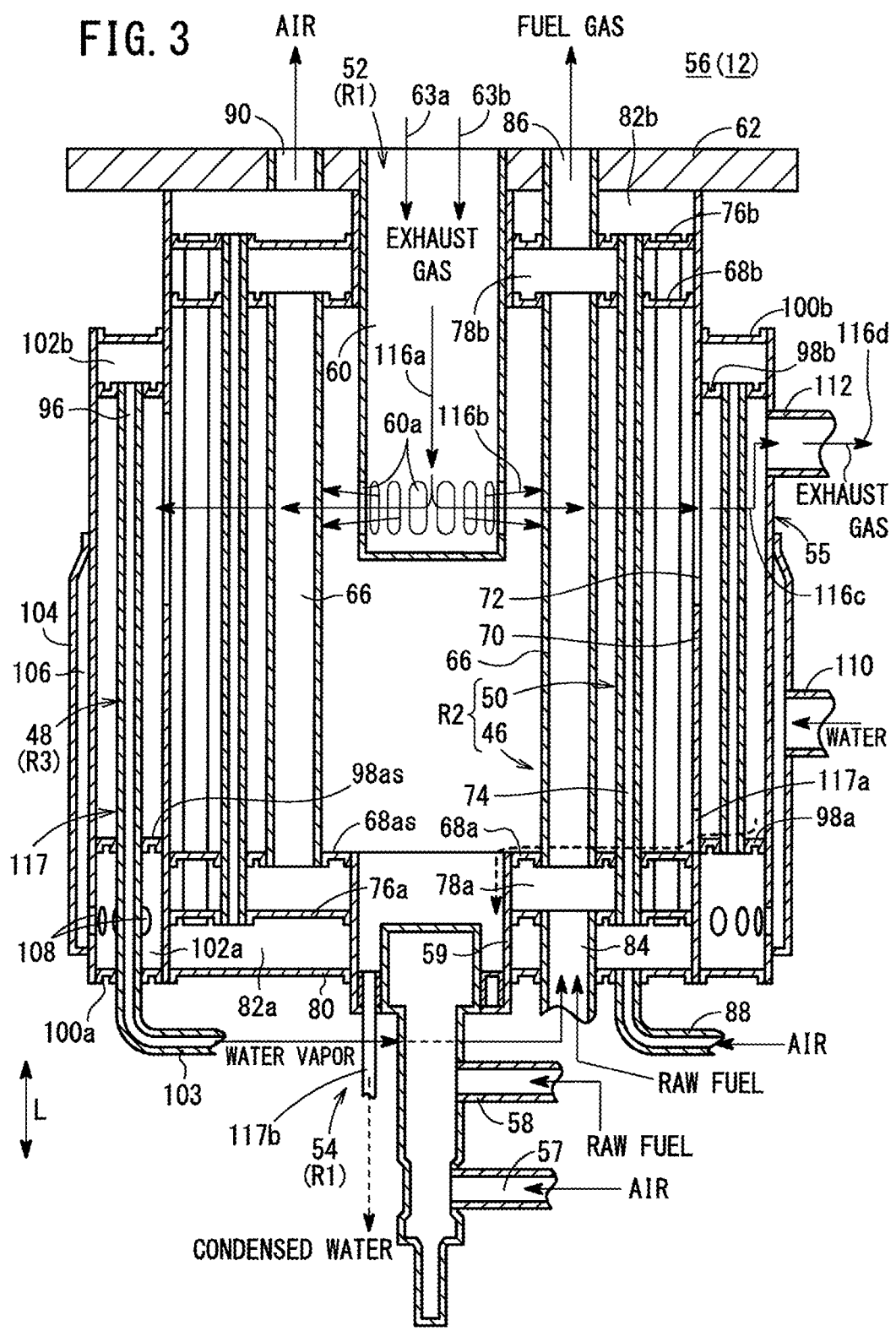
FIG. 3 is a cross sectional view showing the FC peripheral equipment.
Figure 4:
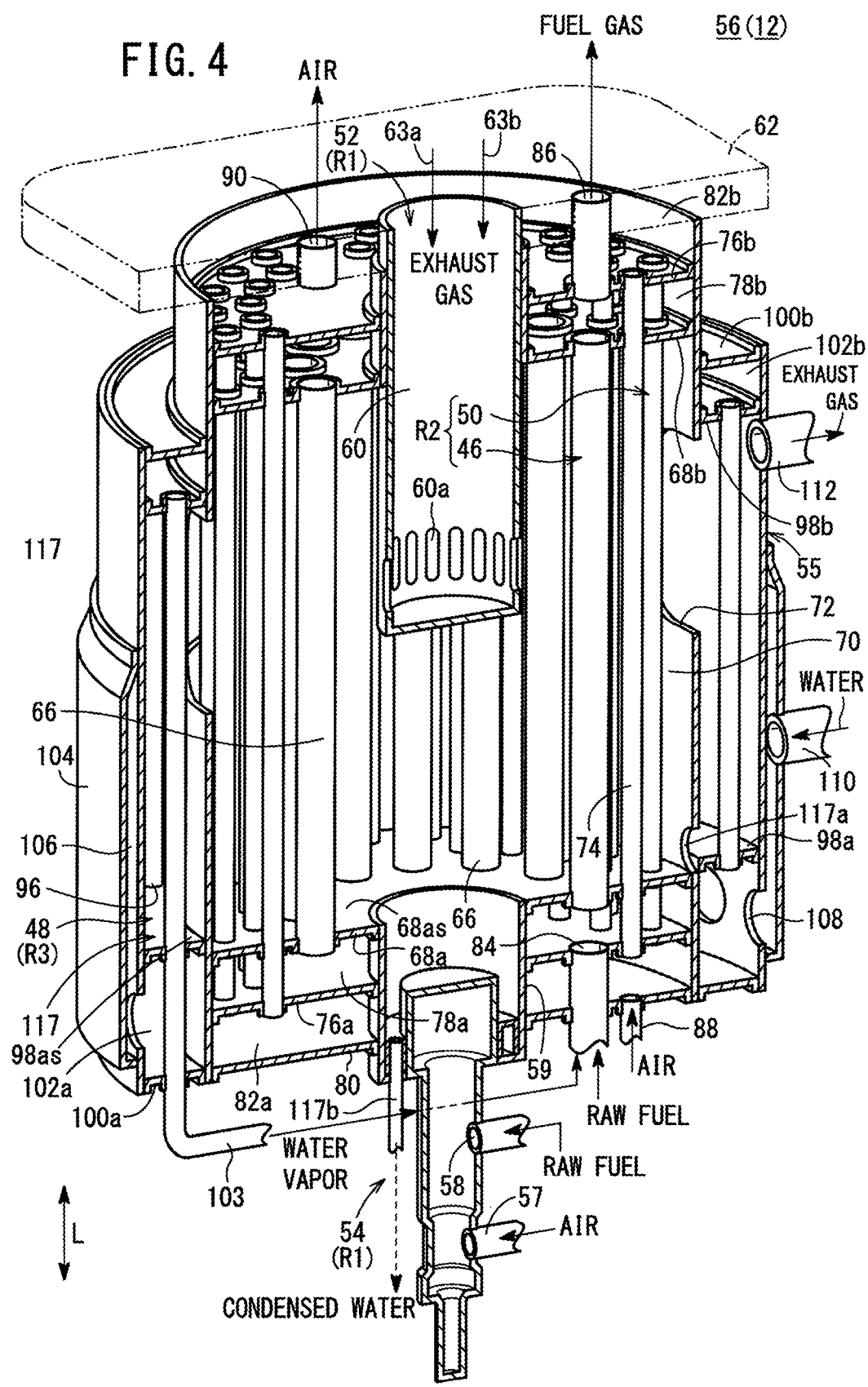
FIG. 4 is a perspective view with partial omission showing the FC peripheral equipment.
Figure 5:
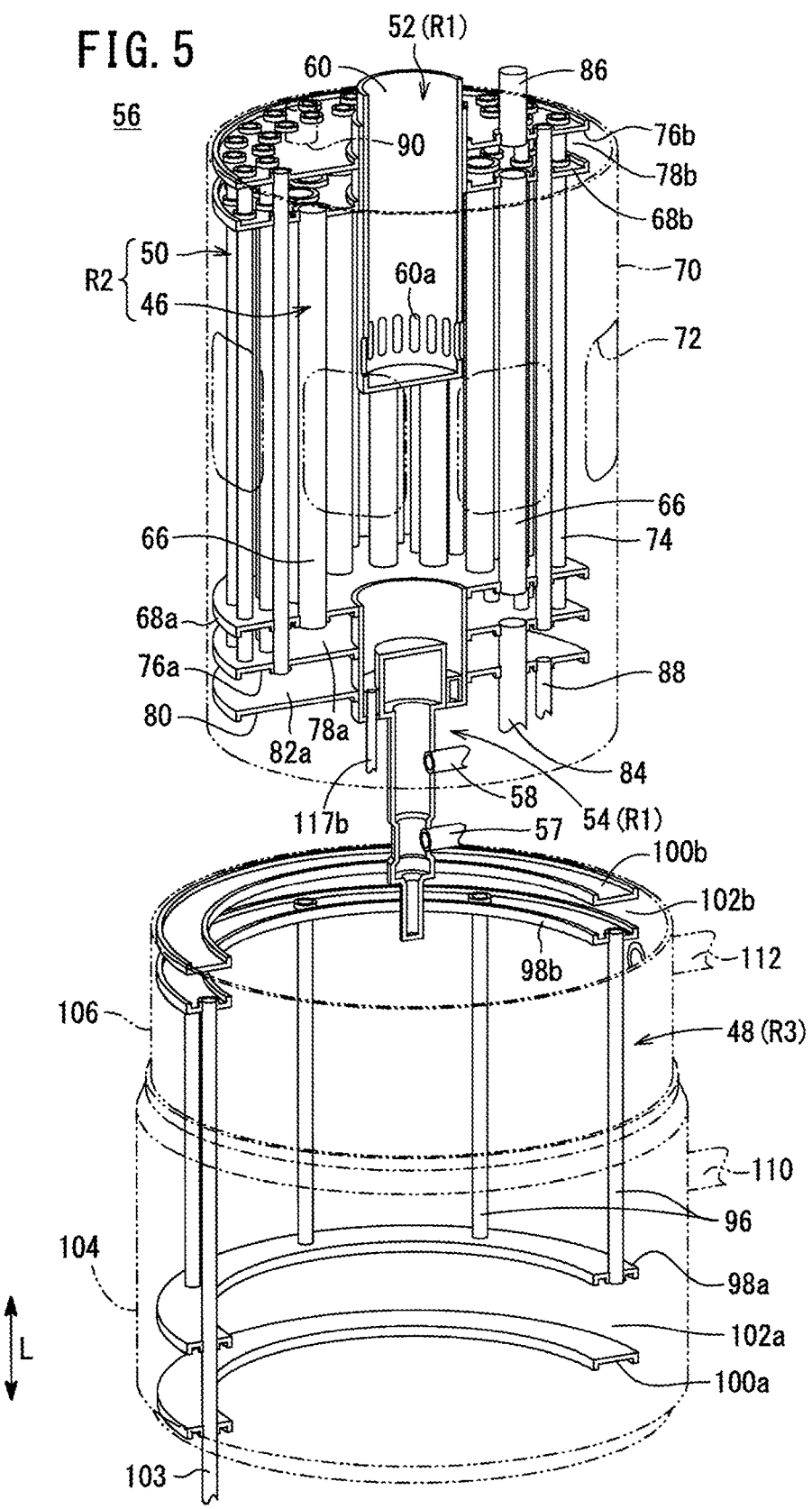
FIG. 5 is an exploded perspective view showing main components of the FC peripheral equipment.

As shown in FIGS. 3 to 5, the FC peripheral equipment 56 includes a first area R1 where the exhaust gas combustor 52 and the start-up combustor 54 are provided, an annular second area R2 formed around the first area R1 and where the reformer 46 and the heat exchanger 50 are provided, an annular third area R3 formed around the second area R2 and where the evaporator 48 is provided. A cylindrical outer member 55 of an outer wall is circumferentially provided outside the third area R3.

The start-up combustor 54 includes an air supply pipe 57 and a raw fuel supply pipe 58. The start-up combustor 54 has an ejector function, and generates negative pressure in the raw fuel supply pipe 58 by the flow of the air supplied from the air supply pipe 57, thereby for sucking the raw fuel. A front combustion portion of the start-up combustor 54 is surrounded by a tubular member 59.

The exhaust gas combustor 52 is spaced away from the start-up combustor 54, and includes a combustion cup 60 formed in a shape of a cylinder having a bottom. A plurality of holes (e.g., circular holes or rectangular holes) 60a are formed along the outer circumference of an end portion of the combustion cup 60 on the bottom side. A stack attachment plate 62 is engaged with the other end portion of the combustion cup 60 on the bottomless side. The fuel cell stack 24 is attached to the stack attachment plate 62.

One end of an oxygen-containing exhaust gas channel 63a and one end of a fuel exhaust gas channel 63b are provided at the combustion cup 60. The combustion gas is produced inside the combustion cup 60 by combustion reaction of the fuel gas (specifically, fuel exhaust gas) and the oxygen-containing gas (specifically, oxygen-containing exhaust gas).

As shown in FIG. 1, the other end of the oxygen-containing exhaust gas channel 63a is connected to the oxygen-containing gas discharge passage 42b of the fuel cell stack 24, and the other end of the fuel exhaust gas channel 63b is connected to the fuel gas discharge passage 44b of the fuel cell stack 24.

As shown in FIGS. 3 to 5, the reformer 46 is a preliminary reformer for reforming higher hydrocarbon ($C_{2+}$) such as ethane ($C_2H_6$), propane ($C_3H_8$), and butane ($C_4H_{10}$) in the city gas (raw fuel) to produce the fuel gas chiefly containing methane ($CH_4$), hydrogen, and CO by steam reforming. The operating temperature of the reformer 46 is set at several hundred ° C.

The reformer 46 includes a plurality of reforming pipes (heat transmission pipes) 66 provided around the exhaust gas combustor 52 and the start-up combustor 54. Each of the reforming pipes 66 are filled with reforming catalyst pellets (not shown). Each reforming pipe 66 is fixed to a first lower ring member 68a at one end (lower end), and fixed to a first upper ring member 68b at the other end (upper end).

The outer circumferential portions of the first lower ring member 68a and the first upper ring member 68b are fixed to the inner circumferential portion of a partition plate 70 having a cylindrical shape by welding or the like. The inner circumferential portions of the first lower ring member 68a and the first upper ring member 68b are fixed to the outer circumferential portion of the combustion cup 60 of the exhaust gas combustor 52 and the outer circumferential portion of the tubular member 59 of the start-up combustor 54 by welding or the like. The partition plate 70 extends in the axial direction indicated by an arrow L, and an end of the partition plate 70 closer to the fuel cell stack 24 is fixed to the stack attachment plate 62. A plurality of openings 72 are formed at predetermined height positions in the outer circumference of the partition plate 70 along the circumferential direction.

Figure 6:
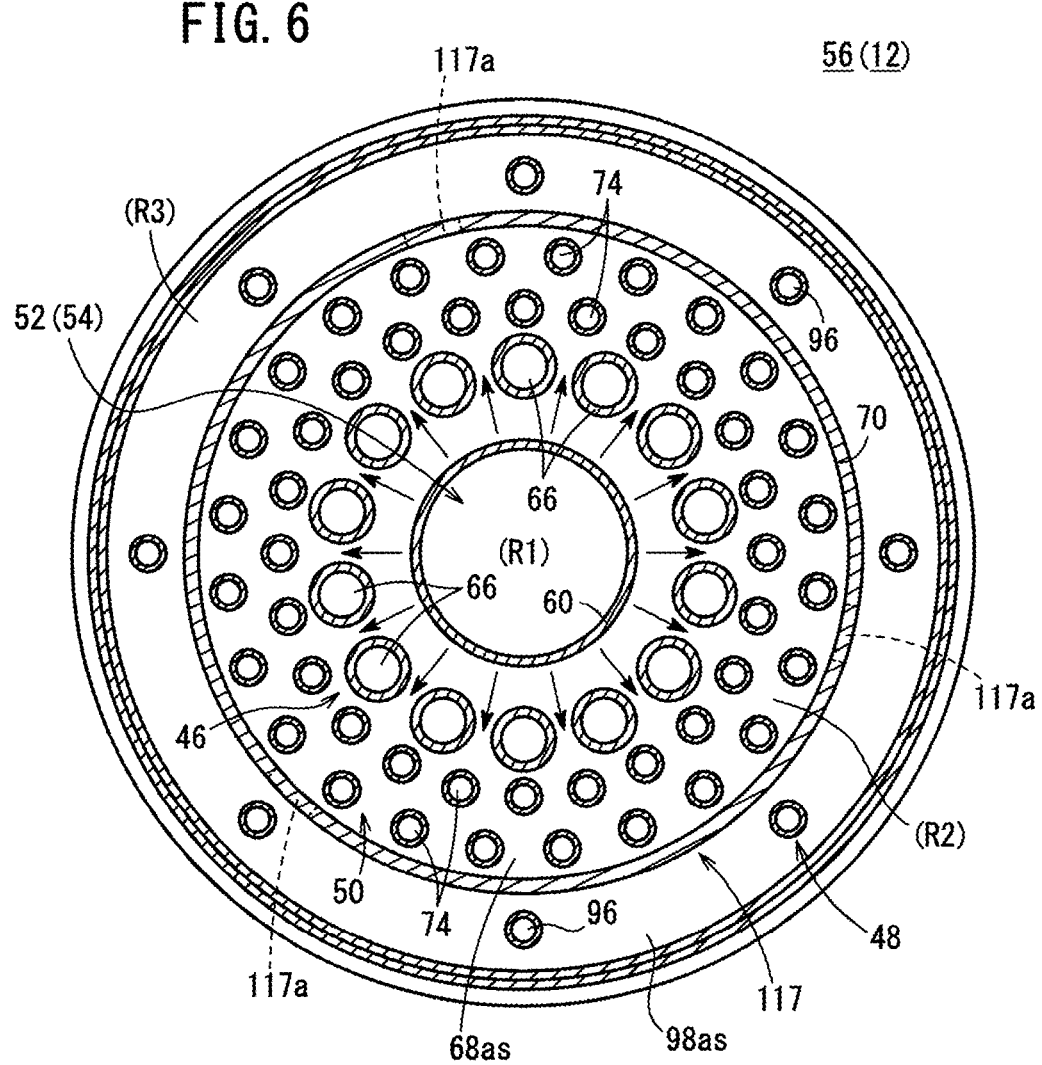
FIG. 6 is a cross sectional plan view showing the FC peripheral equipment.

The heat exchanger 50 has heat exchange pipes (heat transmission pipes) 74 provided adjacent to the reforming pipes 66 of the reformer 46 and arranged radially outwardly with respect to a circular array of the reforming pipes 66 (outside the circular array). As shown in FIG. 6, the reforming pipes 66 are arranged at equal intervals on a virtual circle concentrically around the first area R1. The heat exchange pipes 74 are arranged at equal intervals on two inner and outer virtual circles outside the circular array of the reforming pipes 66, concentrically around the first area R1. The heat exchange pipes 74 arranged along the inner virtual circle and the heat exchange pipes 74 arranged along the outer virtual circle are offset from each other (in a staggered pattern).

As shown in FIGS. 3 and 4, each of the heat exchange pipes 74 is fixed to a second lower ring member 76a at one end (lower end) by welding or the like, and each of the heat exchange pipes 74 is fixed to a second upper ring member 76b at the other end (upper end) by welding or the like. The outer circumferential portions of the second lower ring member 76a and the second upper ring member 76b are fixed to the inner circumferential portion of the partition plate 70 by welding or the like. The inner circumferential portions of the second lower ring member 76a and the second upper ring member 76b are fixed to the outer circumferential portions of the exhaust gas combustor 52 and the start-up combustor 54 by welding or the like.

The second lower ring member 76a is positioned below the first lower ring member 68a (outside the first lower ring member 68a in the axial direction), and the second upper ring member 76b is positioned above the first upper ring member 68b (outside the first upper ring member 68b in the axial direction).

An annular mixed gas supply chamber 78a is formed between the first lower ring member 68a and the second lower ring member 76a, and a mixed gas of raw fuel and water vapor is supplied to the mixed gas supply chamber 78a. Further, an annular fuel gas discharge chamber 78b is formed between the first upper ring member 68b and the second upper ring member 76b, and the produced fuel gas (reformed gas) is discharged to the fuel gas discharge chamber 78b. Both ends of each of the reforming pipes 66 are opened to the mixed gas supply chamber 78a and the fuel gas discharge chamber 78b.

A ring shaped end ring member 80 is fixed to an end of the partition plate 70 adjacent to the start-up combustor 54 by welding or the like. An annular oxygen-containing gas supply chamber 82a is formed between the end ring member 80 and the second lower ring member 76a, and the oxygen-containing gas is supplied to the oxygen-containing gas supply chamber 82a. An annular oxygen-containing gas discharge chamber 82b is formed between the second upper ring member 76b and the stack attachment plate 62, and the heated oxygen-containing gas is discharged to the oxygen-containing gas discharge chamber 82b. Both ends of each of the heat exchange pipes 74 are opened to the oxygen-containing gas supply chamber 82a and the oxygen-containing gas discharge chamber 82b.

The fuel gas discharge chamber 78b and the oxygen-containing gas discharge chamber 82b are provided in double-deck manner, and the fuel gas discharge chamber 78b is provided inside (below) the oxygen-containing gas discharge chamber 82b in the axial direction. The mixed gas supply chamber 78a and the oxygen-containing gas supply chamber 82a are provided in a double-deck manner, and the mixed gas supply chamber 78a is provided inside (above) the oxygen-containing gas supply chamber 82a in the axial direction.

A raw fuel supply channel 84 is opened to the mixed gas supply chamber 78a, and an evaporation return pipe 103 described later is connected to a position in the middle of the raw fuel supply channel 84 (see FIG. 1). The raw fuel supply channel 84 has an ejector function, and generates negative pressure by the flow of the raw fuel, thereby for sucking the water vapor.

The raw fuel supply channel 84 is fixed to the second lower ring member 76a and the end ring member 80 by welding or the like. One end of a fuel gas channel 86 is connected to the fuel gas discharge chamber 78b, and the other end of the fuel gas channel 86 is connected to the fuel gas supply passage 44a of the fuel cell stack 24 (see FIG. 1). The fuel gas channel 86 is fixed to the second upper ring member 76b by welding or the like, and extends through the stack attachment plate 62 (see FIG. 2).

An oxygen-containing gas supply pipe 88 is connected to the oxygen-containing gas supply chamber 82a. The oxygen-containing gas supply pipe 88 is fixed to the end ring member 80 by welding or the like. One end of each of two oxygen-containing gas pipes 90 is provided in the oxygen-containing gas discharge chamber 82b, and the other end of each of the two oxygen-containing gas pipes 90 extends through the stack attachment plate 62, and is connected to the oxygen-containing gas supply passage 42a of the fuel cell stack 24 (see FIG. 1).

As shown in FIGS. 3 and 4, the evaporator 48 has a plurality of evaporation pipes (heat transmission pipes) 96 provided along, and around the outer circumference of the partition plate 70. Each of the evaporation pipes 96 is fixed to a lower ring member 98a at one end (lower end), and fixed to an upper ring member 98b at the other end (upper end).

A lower end ring member 100a is provided below the lower ring member 98a, and an upper end ring member 100b is provided above the upper ring member 98b. The lower end ring member 100a and the upper end ring member 100b are fixed to the outer circumference of the partition plate 70 and the inner circumference of the outer member 55 by welding or the like.

An annular water supply chamber 102a is formed between the lower ring member 98a and the lower end ring member 100a, and water is supplied to the water supply chamber 102a. An annular water vapor discharge chamber 102b is formed between the upper ring member 98b and the upper end ring member 100b, and water vapor is discharged to the water vapor discharge chamber 102b. Both ends of each of the evaporation pipes 96 are fixed to the lower ring member 98a and the upper ring member 98b by welding or the like, and opened to the water supply chamber 102a and the water vapor discharge chamber 102b.

The mixed gas supply chamber 78a and the oxygen-containing gas supply chamber 82a are placed inside the inner circumferential portion of the water supply chamber 102a. The water vapor discharge chamber 102b is provided outside the fuel gas discharge chamber 78b at a position offset downward from the fuel gas discharge chamber 78b in the axial direction (downward in the pipe length direction). One end of the evaporation return pipe 103 including at least one of the evaporation pipes 96 is provided in the water vapor discharge chamber 102b, and the other end of the evaporation return pipe 103 is connected to a position in the middle of the raw fuel supply channel 84 (see FIG. 1).

A cylindrical cover member 104 is fixed to the outer circumferential portion of the outer member 55. The center of the cylindrical cover member 104 is offset to a lower position. Both of upper and lower ends (both of axial ends) of the cover member 104 are welded to the outer member 55, and a heat recovery area (chamber) 106 is formed between the cover member 104 and the outer circumferential portion of the outer member 55.

A plurality of holes 108 are formed circumferentially in a lower end portion of the outer member 55 of the water supply chamber 102a, and the water supply chamber 102a is connected to the heat recovery area 106 through the holes 108. A water supply pipe 110 communicating with the heat recovery area 106 is connected to the cover member 104. An exhaust gas pipe 112 communicating with the third area R3 is connected to an upper portion of the outer member 55.

As shown in FIG. 3, a first combustion gas channel 116a as a passage of the combustion gas is formed in the first area R1, and a second combustion gas channel 116b as a passage of the combustion gas which has passed through the holes 60a is formed in the second area R2. A third combustion gas channel 116c as a passage of the combustion gas which has passed through the openings 72 is formed in the third area R3. Further, a fourth combustion gas channel 116d as a passage of the combustion gas is formed after the exhaust gas pipe 112. The second combustion gas channel 116b forms the reformer 46 and the heat exchanger 50, and the third combustion gas channel 116c forms the evaporator 48.

Figure 7:
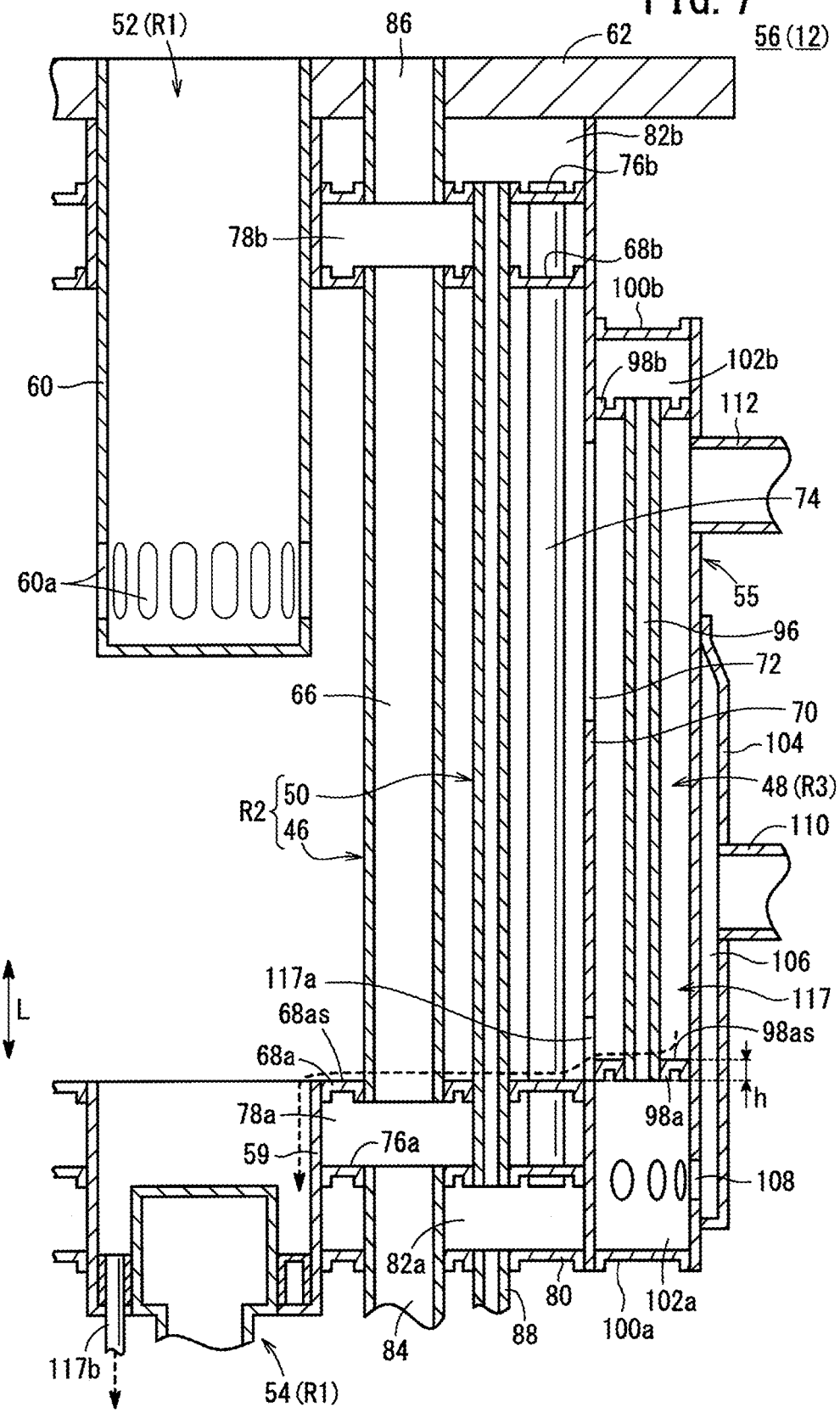
FIG. 7 is a partial cross sectional view showing the FC peripheral equipment.

In the first embodiment, as shown in FIGS. 3, 4, and 7, the FC peripheral equipment 56 includes a condensed water recovery mechanism 117 for recovering condensed water produced by condensation of water vapor contained in the combustion gas by causing the condensed water to flow from the third area R3 to the second area R2, and then, flow from the second area R2 to the first area R1.

The condensed water recovery mechanism 117 includes a first inner ring surface 68 as of the first lower ring member 68a as the bottom of the second area R2, and a second inner ring surface 98 as of the lower ring member 98a as the bottom of the third area R3. As shown in FIG. 7, the bottom surface of the second inner ring surface 98 as is higher than the bottom surface of the first inner ring surface 68 as by a dimension h.

The condensed water recovery mechanism 117 includes condensed water flow holes 117a formed on the lower side of the partition plate 70 (opposite to the upper side where the fuel cell stack 24 is provided). As shown in FIG. 6, the number of the condensed water flow holes 117a is three or more, and the condensed water flow holes 117a are arranged in an annular direction. In the first embodiment, the three condensed water flow holes 117a are arranged at equal angular intervals concentrically around the center of the FC peripheral equipment 56.

Figure 8:
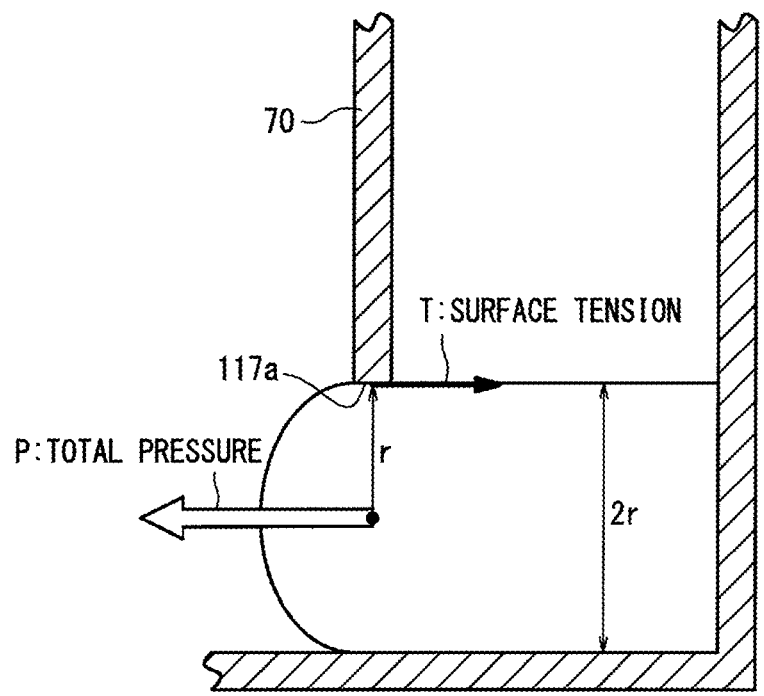
FIG. 8 is a view showing a condensed water flow hole of a condensed water recovery mechanism provided in the FC peripheral equipment.

The opening diameter (2r) of the condensed water flow hole 117a is 8 mm or more. As shown in FIG. 8, for allowing the condensed water to flow through the condensed water flow holes 117a, the total pressure P applied to the opening area needs to be larger than the surface tension T (i.e., total pressure P>surface tension T).

In this regard, assuming that the opening diameter is r, the density of the water is $\rho$, the gravitational acceleration is g, and the surface tension of the water is T, then the relationship thereof is $r \times \rho g \times \pi r^2 > 2\pi r \times T$, and thus the relationship of $r > 3.85$ mm is obtained. Therefore, since $2r > 7.7$, the opening diameter is set to be 8 mm or more.

In the partition plate 70, the upper limit value of the opening diameter should preferably be determined such that the pressure loss in the condensed water flow holes 117a is equal to or lower than, for example, 10% of the pressure loss in the openings 72. The upper limit value can be calculated based on the ratio of the cross sectional area of the openings 72 to the cross sectional area of the condensed water flow holes 117a, which is 10:1. The cross sectional areas are calculated from the number of the openings 72, the opening diameter of the openings 72, the number of the condensed water flow holes 117a, and the opening diameter of the condensed water flow holes 117a.

As shown in FIGS. 3, 4, and 7, a recovery pipe 117b is provided at a lower position of the first area R1, adjacent to the start-up combustor 54. For example, the recovery pipe 117b is connected to a position in the middle of the raw fuel supply channel 84. Thus, the water vapor which has been vaporized again by the exhaust gas in the first area R1 is recovered, and the water vapor can be used for reforming.

As shown in FIG. 1, the raw fuel supply apparatus 14 includes a raw fuel channel 118. The raw fuel channel 118 is branched into the raw fuel supply channel 84 and the raw fuel supply pipe 58 through a raw fuel control valve 120. A desulfurizer 122 for removing sulfur compounds in the city gas (raw fuel) is provided in the raw fuel supply channel 84.

The oxygen-containing gas supply apparatus 16 includes an oxygen-containing gas channel 124. The oxygen-containing gas channel 124 is branched into the oxygen-containing gas supply pipe 88 and the air supply pipe 57 through an oxygen-containing gas control valve 126. The water supply apparatus 18 is connected to the evaporator 48 through the water supply pipe 110.

Operation of the fuel cell system 10 will be described below.

At the time of starting operation of the fuel cell system 10, the air (oxygen-containing gas) and the raw fuel are supplied to the start-up combustor 54. Specifically, in the oxygen-containing gas supply apparatus 16, by operation of the air pump, the air is supplied to the oxygen-containing gas channel 124. By adjusting the opening degree of the oxygen-containing gas control valve 126, the air is supplied to the air supply pipe 57.

In the meanwhile, in the raw fuel supply apparatus 14, by operation of the fuel gas pump, for example, raw fuel such as the city gas (containing $CH_4$, $C_2H_6$, $C_3H_8$, $C_4H_{10}$) is supplied to the raw fuel channel 118. By adjusting the opening degree of the raw fuel control valve 120, the raw fuel is supplied into the raw fuel supply pipe 58. The raw fuel is mixed with the air, and supplied into the start-up combustor 54 (see FIGS. 3 and 4).

Thus, the mixed gas of the raw fuel and the air is supplied into the start-up combustor 54, and the mixed gas is ignited to start combustion. Therefore, the combustion gas produced in combustion flows from the first area R1 to the second area R2. Further, the combustion gas is supplied to the third area R3, and then, the combustion gas is discharged to the outside of the fuel cell module 12 through the exhaust gas pipe 112.

As shown in FIGS. 3 and 4, the reformer 46 and the heat exchanger 50 are provided in the second area R2, and the evaporator 48 is provided in the third area R3. Thus, the combustion gas discharged from the first area R1 first heats the reformer 46, next heats the heat exchanger 50, and then heats the evaporator 48.

Then, after the temperature of the fuel cell module 12 is raised to a predetermined temperature, the air (oxygen-containing gas) is supplied to the heat exchanger 50, and the mixed gas of the raw fuel and the water vapor is supplied to the reformer 46.

Specifically, as shown in FIG. 1, the opening degree of the oxygen-containing gas control valve 126 is adjusted such that the flow rate of the air supplied to the oxygen-containing gas supply pipe 88 is increased, and the opening degree of the raw fuel control valve 120 is adjusted such that the flow rate of the raw fuel supplied to the raw fuel supply channel 84 is increased. Further, by operation of the water supply apparatus 18, the water is supplied to the water supply pipe 110. The air flows from the oxygen-containing gas supply pipe 88 into the oxygen-containing gas supply chamber 82a.

Therefore, as shown in FIGS. 3 and 4, the air flows into the heat exchanger 50, and after the air is temporarily supplied to the oxygen-containing gas supply chamber 82a, while the air is moving inside the heat exchange pipes 74, the air is heated by heat exchange with the combustion gas supplied into the second area R2. After the heated air is temporarily supplied to the oxygen-containing gas discharge chamber 82b, the air is supplied to the oxygen-containing gas supply passage 42a of the fuel cell stack 24 through the oxygen-containing gas pipe 90 (see FIG. 1). In the fuel cell stack 24, the heated air flows along the oxygen-containing gas flow field 38, and the air is supplied to the cathode 28.

After the air flows through the oxygen-containing gas flow field 38, the air is discharged from the oxygen-containing gas discharge passage 42b into the oxygen-containing exhaust gas channel 63a. The oxygen-containing exhaust gas channel 63a is opened to the combustion cup 60 of the exhaust gas combustor 52, and the oxygen-containing exhaust gas is supplied into the combustion cup 60.

Further, as shown in FIG. 1, the water from the water supply apparatus 18 is supplied to the evaporator 48. After the raw fuel is desulfurized at the desulfurizer 122, the raw fuel flows through the raw fuel supply channel 84, and moves toward the reformer 46.

In the evaporator 48, the water is supplied from the water supply pipe 110 to the heat recovery area 106 of the outer member 55. Therefore, after the water is temporarily supplied to the water supply chamber 102a through the holes 108, while water is moving inside the evaporation pipes 96, the water is heated by the combustion gas flowing through the third area R3, and then vaporized.

After the water vapor flows into the water vapor discharge chamber 102b temporarily, the water vapor is supplied to the evaporation return pipe 103 connected to the water vapor discharge chamber 102b. Thus, the water vapor flows inside the evaporation return pipe 103, and flows into the raw fuel supply channel 84. Then, the water vapor is mixed with the raw fuel supplied by the raw fuel supply apparatus 14 to produce the mixed gas.

The mixed gas from the raw fuel supply channel 84 is temporarily supplied to the mixed gas supply chamber 78a of the reformer 46. The mixed gas moves inside the reforming pipes 66. In the meanwhile, the mixed gas is heated by the combustion gas flowing through the second area R2, and steam reforming is performed. After removal (reforming) of hydrocarbon of $C_{2+}$, a reformed gas chiefly containing methane is obtained.

This reformed gas is temporarily supplied as the heated fuel gas to the fuel gas discharge chamber 78b. Thereafter, the fuel gas is supplied to the fuel gas supply passage 44a of the fuel cell stack 24 through the fuel gas channel 86 (see FIG. 1). In the fuel cell stack 24, the heated fuel gas flows along the fuel gas flow field 40, and the fuel gas is supplied to the anode 30, while the air is supplied to the cathode 28, thereby for generating electricity in the electrolyte electrode assembly 32.

After the fuel gas flows through the fuel gas flow field 40, the fuel gas is discharged from the fuel gas discharge passage 44b to the fuel exhaust gas channel 63b. The fuel exhaust gas channel 63b is opened to the inside of the combustion cup 60 of the exhaust gas combustor 52, and the fuel exhaust gas is supplied into the combustion cup 60.

Under the heating operation by the start-up combustor 54, when the temperature of the fuel gas in the exhaust gas combustor 52 exceeds the self-ignition temperature, combustion of the oxygen-containing exhaust gas and the fuel exhaust gas is started inside the combustion cup 60. In the meanwhile, combustion operation by the start-up combustor 54 is stopped.

The combustion cup 60 has the holes 60*a*. Therefore, as shown in FIG. 3, the combustion gas supplied into the combustion cup 60 flows through the holes 60*a* from the first area R1 into the second area R2. Then, after the combustion gas is supplied to the third area R3, the combustion gas is discharged to the outside of the fuel cell module 12.

In the FC peripheral equipment 56, the combustion gas flows from the first area R1 to the second area R2, and then flows from the second area R2 to the third area R3 successively for heat exchange. Then, the combustion gas is discharged to the outside. At this time, the water vapor in the combustion gas is condensed due to the decrease in the temperature of the combustion gas. In particular, the thus-condensed water tends to be retained in the third area R3 where the temperature is relatively low.

As shown in FIG. 7, the condensed water retained in the third area R3 flows through the condensed water flow holes 117*a* of the condensed water recovery mechanism 117, formed on the lower side of the partition plate 70, and moves into the second area R2. Thereafter, the condensed water moves to the first area R1, and then, flows into the tubular member 59 of the start-up combustor 54. In the first area R1, since the hot exhaust gas is present, the condensed water is vaporized to produce water vapor. This water vapor (containing the condensed water) is recovered through the recovery pipe 117*b*.

In the first embodiment, the FC peripheral equipment 56 includes the first area R1 where the exhaust gas combustor 52 and the start-up combustor 54 are provided, the annular second area R2 around the first area R1 and where the reformer 46 and the heat exchanger 50 are provided, and the annular third area R3 around the second area R2 and where the evaporator 48 is provided.

That is, the first area R1 is provided at the center, the annular second area R2 is provided around the first area R1, and the annular third area R3 is provided around the second area R2. In the structure, generation of waste heat and heat radiation can be suppressed suitably. Thus, improvement in the heat efficiency is achieved, thermally self-sustaining operation is facilitated, and simple and compact structure of the fuel cell module 12 is achieved as a whole. Thermally self-sustaining operation herein means operation where the operating temperature of the fuel cell 22 is maintained using only heat energy generated in the fuel cell 22, without supplying additional heat from the outside.

Further, the FC peripheral equipment 56 includes the condensed water recovery mechanism 117. Therefore, the condensed water produced by condensation of water vapor in the combustion gas flows from the third area R3 to the second area R2, and then, flows from the second area R2 to the first area R1, i.e., the condensed water can flow from the low temperature side to the high temperature side.

Therefore, transition of the condensed water again into the gas phase is facilitated. The condensed water is not retained in the FC peripheral equipment 56. Thus, the influence on the durability of the FC peripheral equipment 56 is suppressed as much as possible, and it becomes possible to use the recovered condensed water as the water vapor for reforming.

Further, in the first embodiment, as shown in FIG. 3, the reformer 46 includes the annular mixed gas supply chamber 78*a*, the annular fuel gas discharge chamber 78*b*, the reforming pipes 66, and the second combustion gas channel 116*b*.

The mixed gas is supplied to the mixed gas supply chamber 78*a*, the produced fuel gas is discharged into the fuel gas discharge chamber 78*b*. The reforming pipes 66 each include one end connected to the mixed gas supply chamber 78*a*, and the other end connected to the fuel gas discharge chamber 78*b*. The second combustion gas channel 116*b* supplies the combustion gas into the spaces between the reforming pipes 66.

The heat exchanger 50 includes the annular oxygen-containing gas supply chamber 82*a*, the annular oxygen-containing gas discharge chamber 82*b*, the heat exchange pipes 74, and the second combustion gas channel 116*b*. The oxygen-containing gas is supplied to the oxygen-containing gas supply chamber 82*a*, and the heated oxygen-containing gas is discharged into the oxygen-containing gas discharge chamber 82*b*. The heat exchange pipes 74 each include one end connected to the oxygen-containing gas supply chamber 82*a*, and the other end connected to the oxygen-containing gas discharge chamber 82*b*. The combustion gas is supplied to the spaces between the heat exchange pipes 74 through the second combustion gas channel 116*b*.

The evaporator 48 includes the annular water supply chamber 102*a*, the annular water vapor discharge chamber 102*b*, the evaporation pipes 96, and the third combustion gas channel 116*c*. The water is supplied to the water supply chamber 102*a*, and the water vapor is discharged into the water vapor discharge chamber 102*b*. The evaporation pipes 96 each include one end connected to the water supply chamber 102*a*, and the other end connected to the water vapor discharge chamber 102*b*. The third combustion gas channel 116*c* supplies the combustion gas into the spaces between the evaporation pipes 96.

As described above, the annular supply chambers (mixed gas supply chamber 78*a*, oxygen-containing gas supply chamber 82*a*, and water supply chamber 102*a*), the annular discharge chambers (fuel gas discharge chamber 78*b*, oxygen-containing gas discharge chamber 82*b*, and water vapor discharge chamber 102*b*) and the pipes (reforming pipes 66, heat exchange pipes 74, and evaporation pipes 96) are provided as basic structure. Thus, simple structure is achieved easily. Accordingly, the production cost of the fuel cell module 12 is reduced effectively. Further, by changing the volumes of the supply chambers and the discharge chambers, the length, the diameter, and the number of the pipes, the desired operation can be achieved depending on various operating conditions, and a wider variety of designs become available.

Further, the fuel gas discharge chamber 78*b* and the oxygen-containing gas discharge chamber 82*b* are provided in a double-deck manner, and the fuel gas discharge chamber 78*b* is provided on the inner side of the oxygen-containing gas discharge chamber 82*b* in the axial direction (i.e., below the oxygen-containing gas discharge chamber 82*b*). The mixed gas supply chamber 78*a* and the oxygen-containing gas supply chamber 82*a* are provided in a double-deck manner, and the mixed gas supply chamber 78*a* is provided on the inner side the oxygen-containing gas supply chamber 82*a* in the axial direction (i.e., above the oxygen-containing gas supply chamber 82*a*).

In the structure, in the second area R2, it becomes possible to provide the reformer 46 and the heat exchanger 50 in a small space efficiently, and reduction in the overall size of the FC peripheral equipment 56 is achieved easily.

Further, the mixed gas supply chamber 78*a* is formed between the first lower ring member (inner ring) 68*a* into which ends of the reforming pipes 66 are inserted and the second lower ring member (outer ring) 76*a* spaced away from the first lower ring member 68a. The fuel gas discharge chamber 78b is formed between the first upper ring member (inner ring) 68b into which ends of the reforming pipes 66 are inserted and the second upper ring member (outer ring) 76b spaced away from the first upper ring member 68b.

Further, the oxygen-containing gas supply chamber 82a is formed between the second lower ring member (inner ring) 76a into which ends of the heat exchange pipes 74 are inserted and the end ring member (outer ring) 80 spaced away from the second lower ring member 76a. The oxygen-containing gas discharge chamber 82b is formed between the second upper ring member (inner ring) 76b into which ends of the heat exchange pipes 74 are inserted and the stack attachment plate (outer ring) 62 spaced away from the second upper ring member 76b.

Likewise, the water supply chamber 102a is formed between the lower ring member (inner ring) 98a into which ends of the evaporation pipes 96 are inserted and the lower end ring member (outer ring) 100a spaced away from the lower ring member 98a. The water vapor discharge chamber 102b is formed between the upper ring member (inner ring) 98b into which ends of the evaporation pipes 96 are inserted and the upper end ring member (outer ring) 100b spaced away from the upper ring member 98b.

In the structure, each of the mixed gas supply chamber 78a, the fuel gas discharge chamber 78b, the oxygen-containing gas supply chamber 82a, the oxygen-containing gas discharge chamber 82b, the water supply chamber 102a, and the water vapor discharge chamber 102b is made of the inner ring and the outer ring, and the structure of these chambers is simplified effectively. Thus, the production cost is reduced effectively, and the size reduction is achieved easily.

Further, the fuel gas discharge chamber 78b, the oxygen-containing gas discharge chamber 82b, and the water vapor discharge chamber 102b are provided at one end adjacent to the fuel cell stack 24, and the mixed gas supply chamber 78a, the oxygen-containing gas supply chamber 82a, and the water supply chamber 102a are provided at the opposite end remote from the fuel cell stack 24.

In the structure, the heated reactant gases immediately after reforming (fuel gas and oxygen-containing gas) can be supplied to the fuel cell stack 24 promptly. Further, the exhaust gas from the fuel cell stack 24 can be supplied to the exhaust gas combustor 52, the reformer 46, the heat exchanger 50, and the evaporator 48 of the FC peripheral equipment 56 while suppressing decrease in the temperature of the exhaust gas from the fuel cell stack 24 due to heat radiation as much as possible. Thus, improvement in the heat efficiency is achieved, and thermally self-sustaining operation is facilitated.

Further, the condensed water recovery mechanism 117 includes the first inner ring surface 68 as of the first lower ring member 68a as the bottom of the second area R2 and the second inner ring surface 98 as of the lower ring member 98a as the bottom of the third area R3. Further, as shown in FIG. 7, the bottom surface of the second inner ring surface 98 as is higher than the bottom surface of the first inner ring surface 68 as by the dimension h.

In the structure, the condensed water can flow from the outer side (low temperature side) to the inner side (high temperature side) of the FC peripheral equipment 56. Transition of the condensed water again into the gas phase is facilitated. The condensed water is not retained in the FC peripheral equipment 56. Thus, the influence on the durability of the FC peripheral equipment 56 is suppressed as much as possible, and it becomes possible to use the recovered condensed water as the water vapor used for reforming.

Further, the FC peripheral equipment 56 includes the partition plate 70 provided vertically between the second area R2 and the third area R3. The condensed water recovery mechanism 117 includes the condensed water flow holes 117a formed on the lower side of the partition plate 70 opposite to the upper side where the fuel cell stack 24 is provided.

In the structure, blow-through of the combustion gas is suppressed suitably, and further improvement in the heat efficiency is achieved. In addition, thermally self-sustaining operation is facilitated reliably. Further, the condensed water flows through the condensed water flow holes 117a provided in the partition plate 70, and flows from the outer side (low temperature side) to the inner side (high temperature side) of the FC peripheral equipment 56. Thus, transition of the condensed water again into the gas phase is facilitated, and the condensed water is not retained in the FC peripheral equipment 56. Accordingly, influence on the durability of the FC peripheral equipment 56 is suppressed as much as possible, and it becomes possible to use the recovered condensed water as the water vapor for reforming.

Further, as shown in FIG. 6, the number of the condensed water flow holes 117a is three or more, and the condensed water flow holes 117a are arranged in the annular direction. In the structure, even if the FC peripheral equipment 56 is tilted, e.g., depending on the installation condition of the FC peripheral equipment 56, the condensed water can be recovered reliably. Therefore, it becomes possible to suppress the influence on the durability of the FC peripheral equipment 56 as much as possible.

Further, the condensed water flow holes 117a have the opening diameter of 8 mm or more. Therefore, the flow of the condensed water is not blocked by the surface tension of the condensed water, and the condensed water can be recovered reliably. Accordingly, it becomes possible to suppress the influence on the durability of the FC peripheral equipment 56 as much as possible.

Further, the fuel cell module 12 is a solid oxide fuel cell module. Therefore, the fuel cell module 12 is optimally applicable to high temperature type fuel cells such as SOFC.

Figure 9:
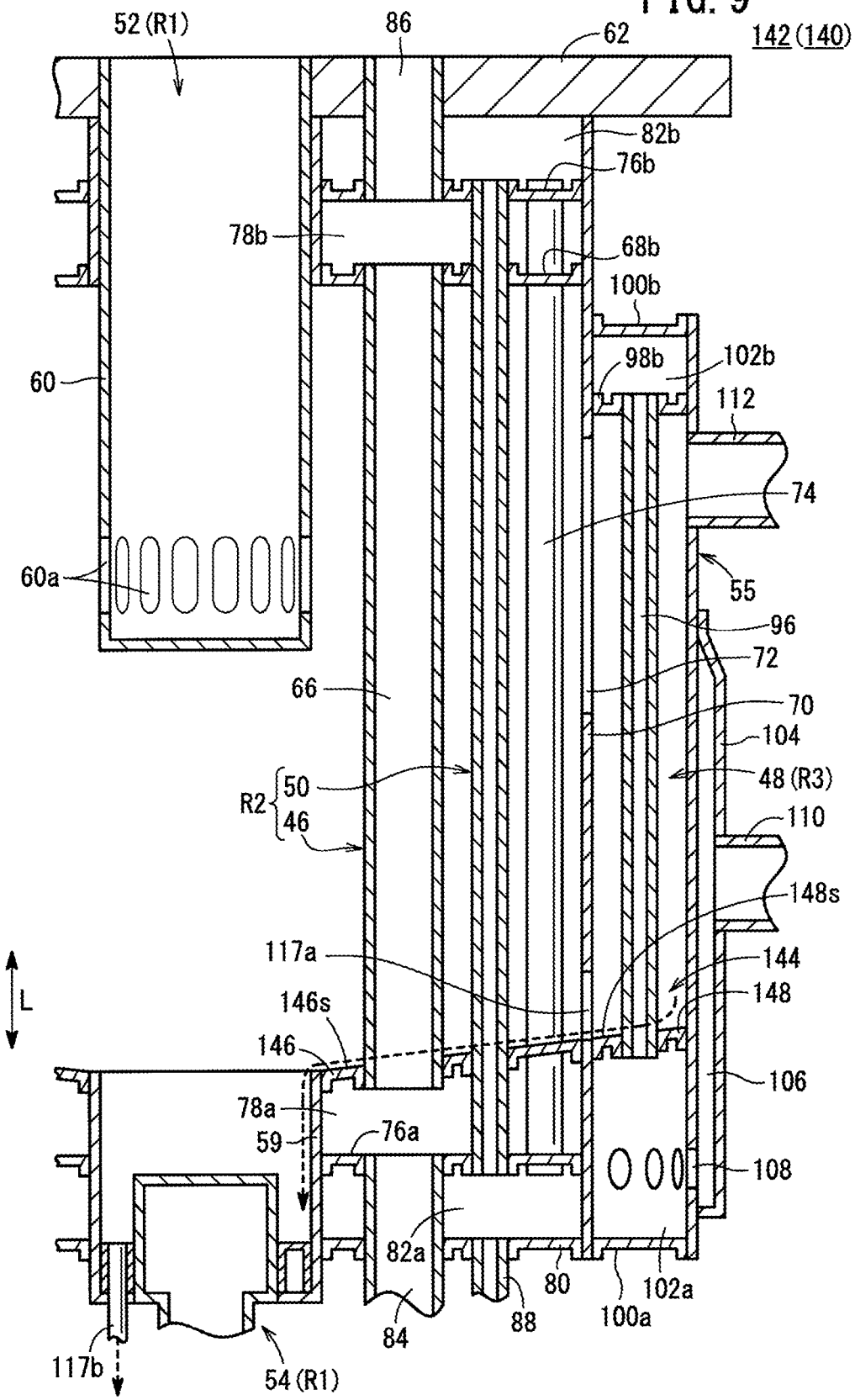
FIG. 9 is a partial cross sectional view showing FC peripheral equipment of a fuel cell module according to a second embodiment of the present invention.

FIG. 9 is a partial cross sectional view showing a FC peripheral equipment 142 of a fuel cell module 140 according to a second embodiment of the present invention. The constituent elements of the fuel cell module 140 according to the second embodiment of the present invention that are identical to those of the fuel cell module 12 according to the first embodiment are labeled with the same reference numeral, and description thereof will be omitted. Also in a third embodiment described later, the constituent elements that are identical to those of the fuel cell module 12 according to the first embodiment are labeled with the same reference numeral, and description thereof will be omitted.

The FC peripheral equipment 142 includes a condensed water recovery mechanism 144. The condensed water recovery mechanism 144 includes a first inner ring surface 146s of a first lower ring member 146 as the bottom of the second area R2, and a second inner ring surface 148s of a lower ring member 148 as the bottom of the third area R3.

The first lower ring member 146 corresponds to the first lower ring member 68a according to the first embodiment, and the lower ring member 148 corresponds to the lower ring member 98a according to the first embodiment. The first lower ring member 146 and the lower ring member 148 are inclined downward toward the center of the first area R1.

That is, each of the first inner ring surface 146s and the second inner ring surface 148s is inclined downward from its outer circumferential end toward the inner circumferential end, and a downward inclination is formed from the second inner ring surface 148s to the first inner ring surface 146s as a whole.

In the second embodiment, the condensed water in the third area R3 moves along the inclined second inner ring surface 148s toward the partition plate 70, and then, moves through the condensed water flow holes 117a into the second area R2. Further, the condensed water moves along the inclined first inner ring surface 146s to the first area R1, and flows into the tubular member 59. Therefore, the same advantages as in the case of the first embodiment are obtained. For example, the condensed water can be discharged further smoothly, generation of the waste heat and heat radiation are suppressed suitably, improvement in the heat efficiency is achieved, and thermally self-sustaining operation can be facilitated.

Figure 10:
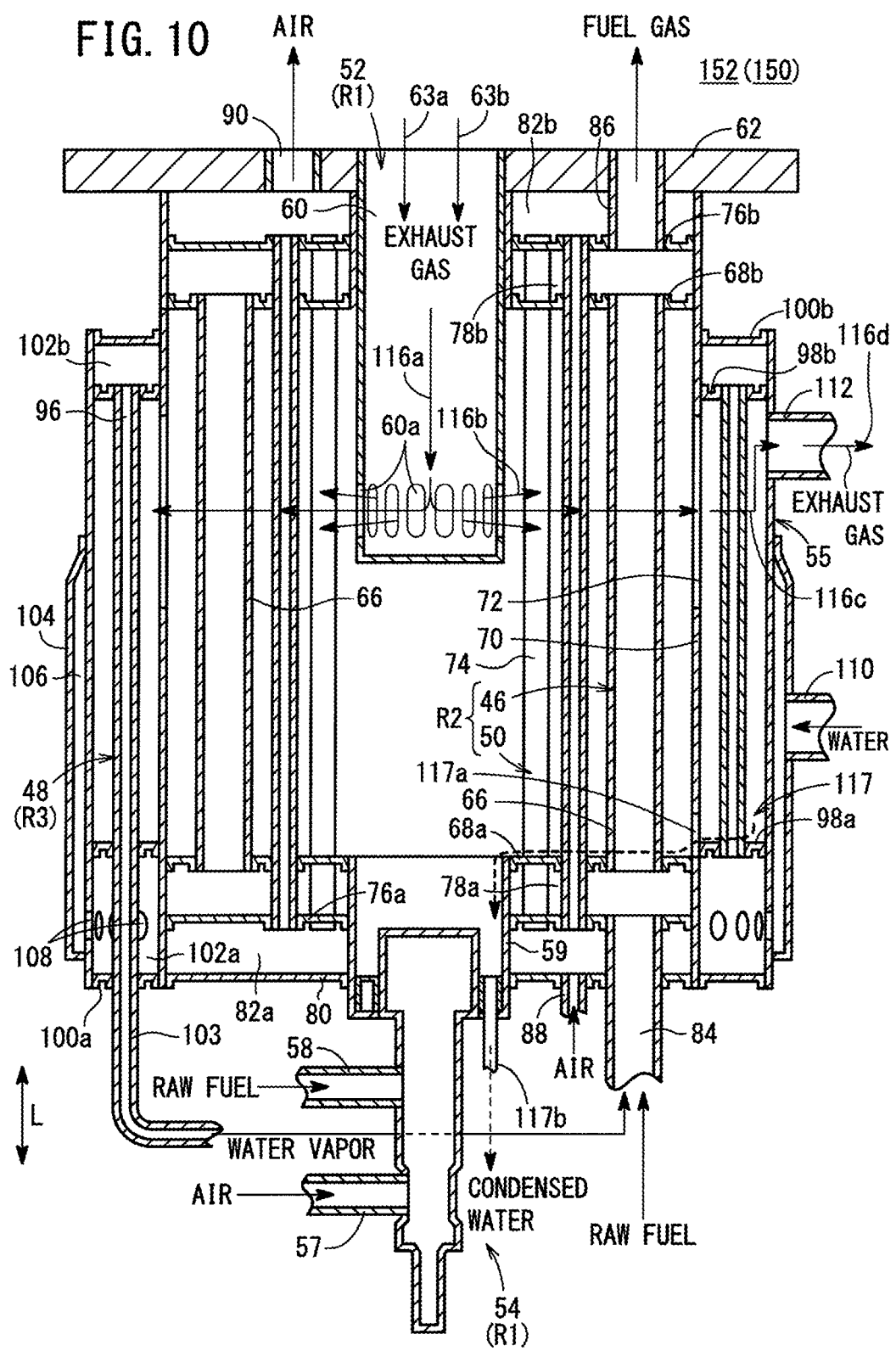
FIG. 10 is a cross sectional view showing FC peripheral equipment of a fuel cell module according to a third embodiment of the present invention.

FIG. 10 is a cross sectional view showing an FC peripheral equipment 152 of a fuel cell module 150 according to a third embodiment.

Figure 11:
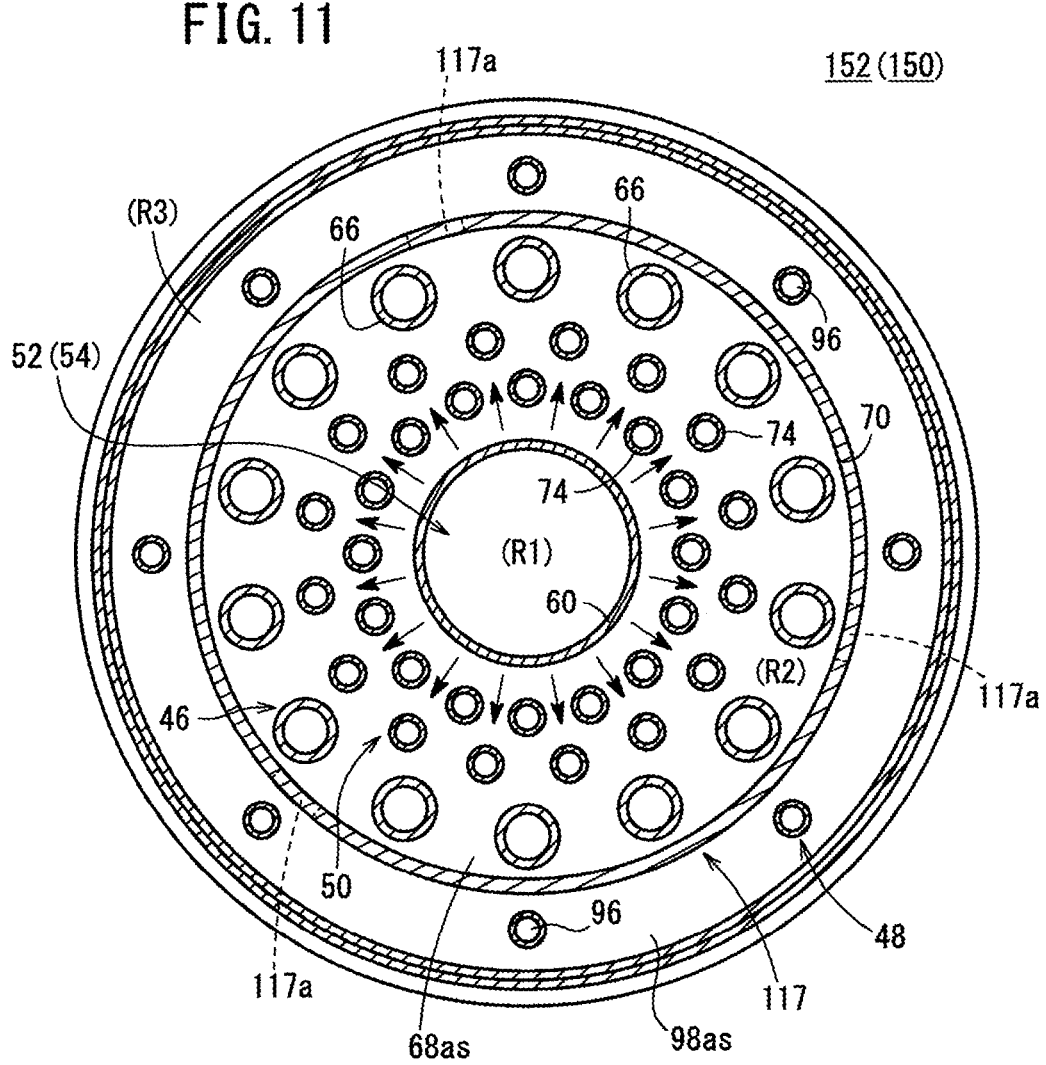
FIG. 11 is a cross sectional plan view showing the FC peripheral equipment.
Figure 12:
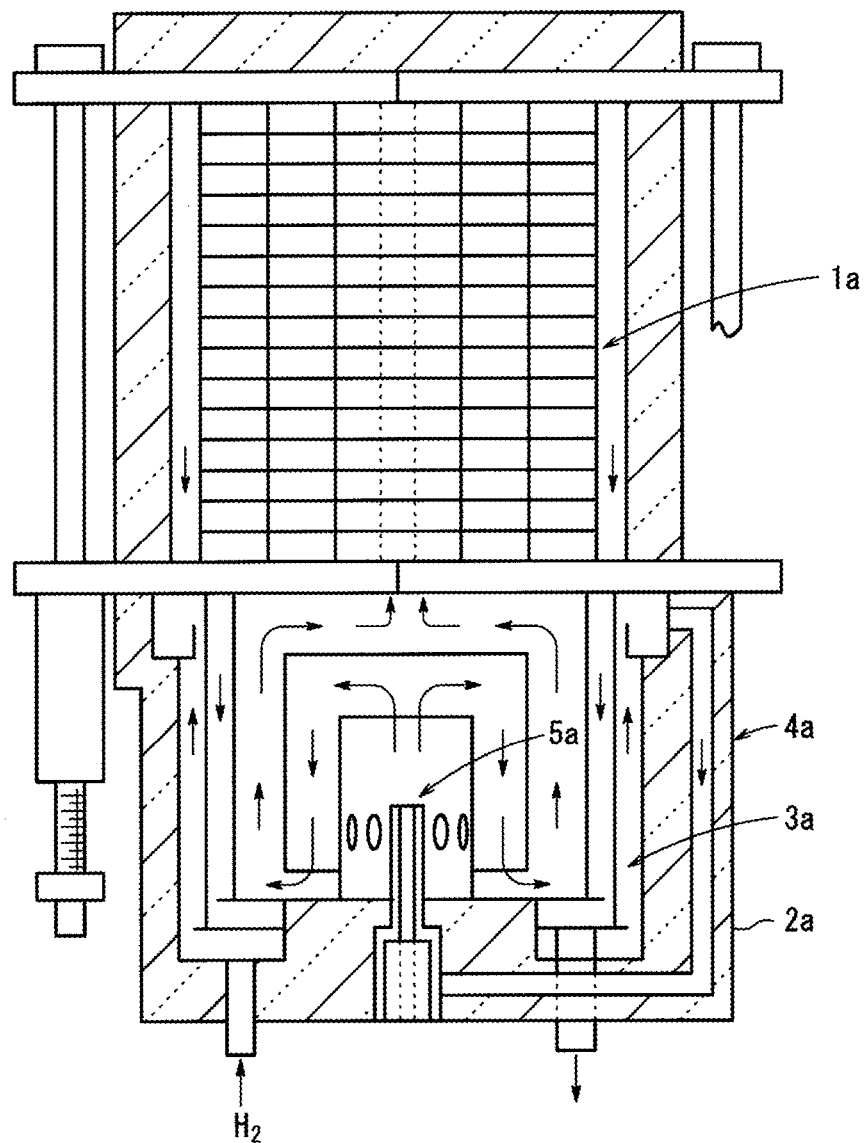
FIG. 12 is a view schematically showing a fuel cell battery disclosed in the conventional technique 1.
Figure 13:
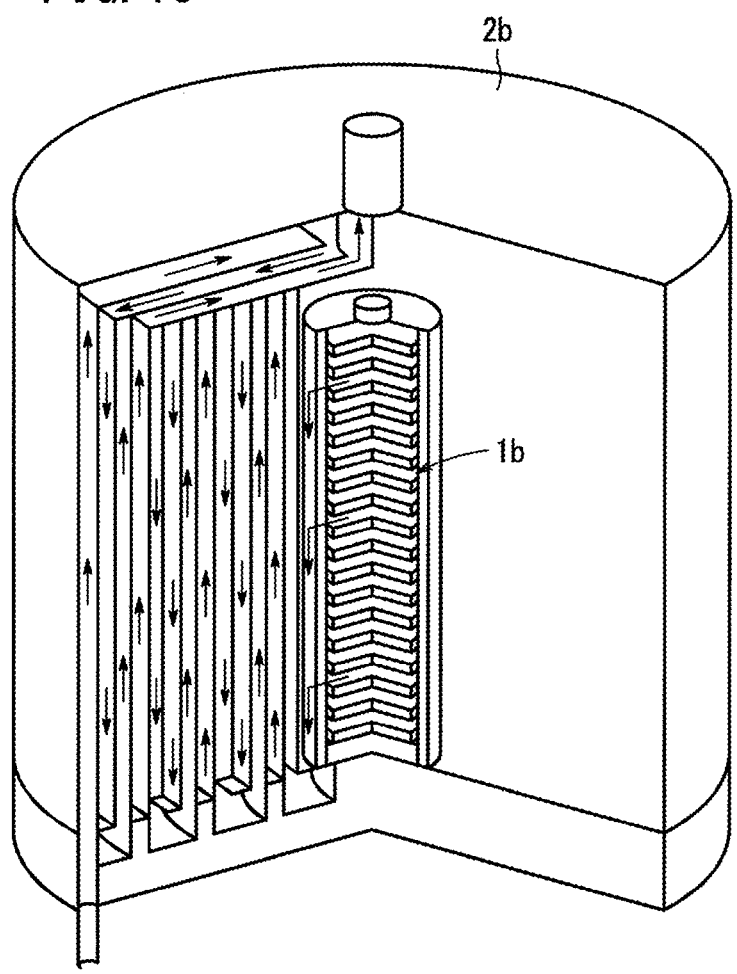
FIG. 13 is a perspective view with partial cutout, showing a solid oxide fuel cell disclosed in the conventional technique 2.
Figure 14:
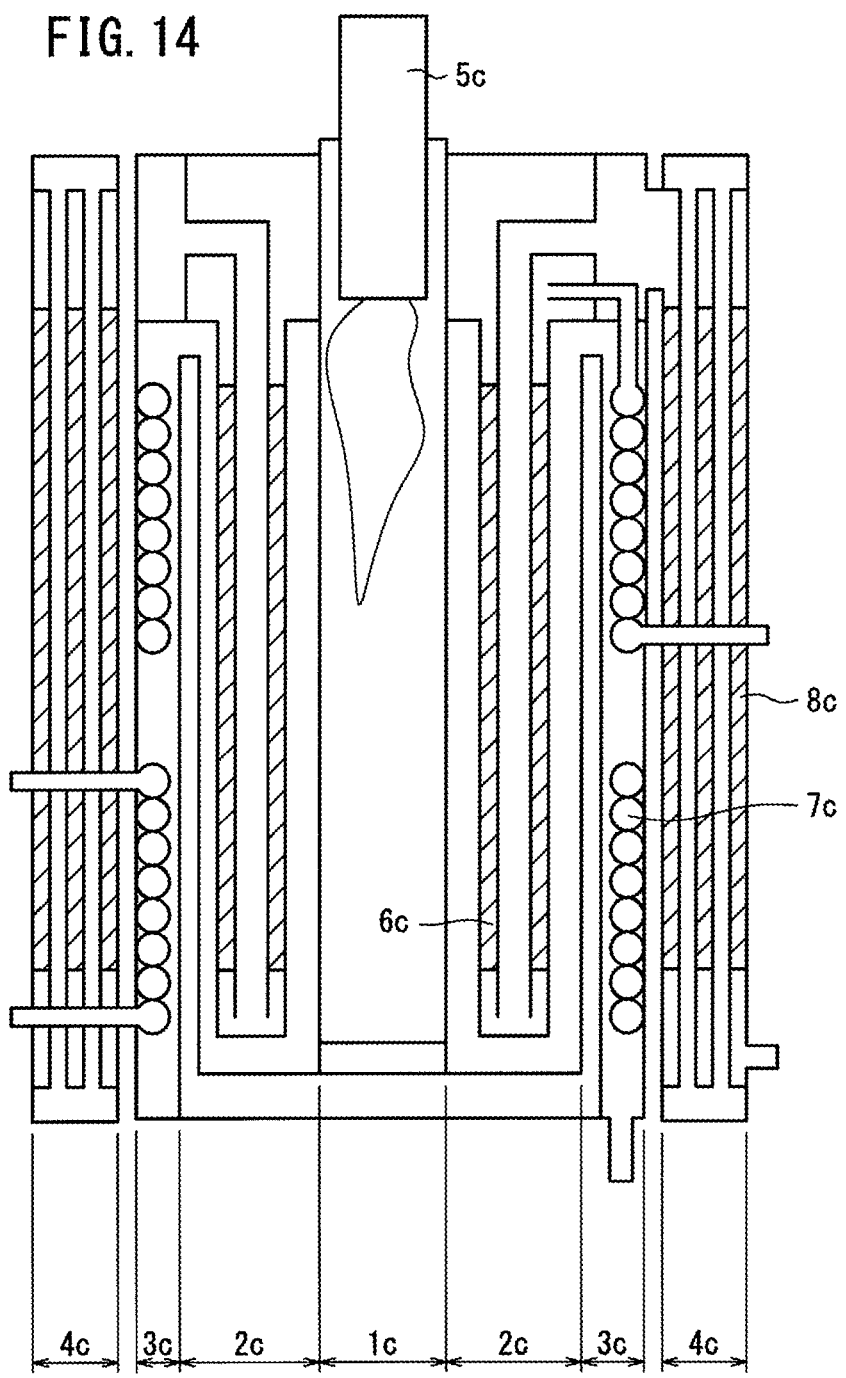
FIG. 14 is a view schematically showing a fuel cell system disclosed in the conventional technique 3.

As shown in FIGS. 10 and 11, in the FC peripheral equipment 152, the reformer 46 is provided radially outwardly of the heat exchanger 50 in the second area R2. The heat exchanger 50 includes heat exchange pipes 74 arranged along two virtual circles around the first area R1 in a zigzag pattern (staggered manner). The reformer 46 includes reforming pipes 66 arranged along a virtual circle around the first area R1, outside the circle arrays of the heat exchange pipes 74.

In the third embodiment, the same advantages as in the case of the first embodiment are obtained. The third embodiment may adopt the same structure as the second embodiment.

The invention claimed is:

1. A fuel cell module comprising:
a fuel cell stack formed by stacking a plurality of fuel cells for generating electricity by electrochemical reactions of a fuel gas and an oxygen-containing gas;
a reformer for reforming a mixed gas of a raw fuel containing hydrocarbon and water vapor to produce the fuel gas supplied to the fuel cell stack;
an evaporator for evaporating water, and supplying the water vapor to the reformer;
a heat exchanger for raising the temperature of the oxygen-containing gas by heat exchange with a combustion gas, and supplying the oxygen-containing gas to the fuel cell stack;
an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas; and
a start-up combustor for combusting the raw fuel and the oxygen-containing gas to produce the combustion gas,
wherein the fuel cell module includes:
a first area where the exhaust gas combustor and the start-up combustor are provided;
an annular second area around the first area and where the reformer and the heat exchanger are provided;
an annular third area around the second area and where the evaporator is provided; and
a condensed water recovery mechanism for recovering condensed water produced by condensation of water vapor contained in the combustion gas by causing the condensed water to flow from the third area to the second area and then flow from the second area to the first area.

2. A fuel cell module comprising:
a fuel cell stack formed by stacking a plurality of fuel cells for generating electricity by electrochemical reactions of a fuel gas and an oxygen-containing gas;
a reformer for reforming a mixed gas of a raw fuel containing hydrocarbon and water vapor to produce the fuel gas supplied to the fuel cell stack;
an evaporator for evaporating water, and supplying the water vapor to the reformer;
a heat exchanger for raising the temperature of the oxygen-containing gas by heat exchange with a combustion gas, and supplying the oxygen-containing gas to the fuel cell stack;
an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas; and
a start-up combustor for combusting the raw fuel and the oxygen-containing gas to produce the combustion gas,
wherein the fuel cell module includes:
a first area where the exhaust gas combustor and the start-up combustor are provided;
an annular second area around the first area and where the reformer and the heat exchanger are provided;
an annular third area around the second area and where the evaporator is provided; and
a condensed water recovery mechanism for recovering condensed water produced by condensation of water vapor contained in the combustion gas by causing the condensed water to flow from the third area to the second area and then flow from the second area to the first area;
wherein the reformer includes an annular mixed gas supply chamber to which the mixed gas is supplied, an annular fuel gas discharge chamber to which the produced fuel gas is discharged, a plurality of reforming pipes each having one end connected to the mixed gas supply chamber and another end connected to the fuel gas discharge chamber, and a combustion gas channel for supplying the combustion gas between the reforming pipes;
wherein the evaporator includes an annular water supply chamber to which the water is supplied, an annular water vapor discharge chamber to which the water vapor is discharged, a plurality of evaporation pipes each having one end connected to the water supply chamber and another end connected to the water vapor discharge chamber, and a combustion gas channel for supplying the combustion gas between the evaporation pipes; and
wherein the heat exchanger includes an annular oxygen-containing gas supply chamber to which the oxygen-containing gas is supplied, an annular oxygen-containing gas discharge chamber to which the heated oxygen-containing gas is discharged, a plurality of heat exchange pipes each having one end connected to the oxygen-containing gas supply chamber and another end connected to the oxygen-containing gas discharge chamber, and a combustion gas channel for supplying the combustion gas between the heat exchange pipes.

3. The fuel cell module according to claim 2, wherein the fuel gas discharge chamber and the oxygen-containing gas discharge chamber are provided in a double deck manner, and the fuel gas discharge chamber is provided on an inner side with respect to the oxygen-containing gas discharge chamber in an axial direction; and the mixed gas supply chamber and the oxygen-containing gas supply chamber are provided in a double deck manner, and the mixed gas supply chamber is provided on an inner side with respect to the oxygen-containing gas supply chamber in the axial direction.

4. The fuel cell module according to claim 2, wherein each of the mixed gas supply chamber and the fuel gas discharge chamber is formed between an inner ring into which ends of the reforming pipes are inserted and an outer ring spaced away from the inner ring;

each of the water supply chamber and the water vapor discharge chamber is formed between an inner ring into which ends of the evaporation pipes are inserted and an outer ring spaced away from the inner ring; and each of the oxygen-containing gas supply chamber and the oxygen-containing gas discharge chamber is formed between an inner ring into which ends of the heat exchange pipes are inserted and an outer ring spaced away from the inner ring.

5. The fuel cell module according to claim 2, wherein the fuel gas discharge chamber, the oxygen-containing gas discharge chamber, and the water vapor discharge chamber are provided at one end adjacent to the fuel cell stack; and the mixed gas supply chamber, the oxygen-containing gas supply chamber, and the water supply chamber are provided at the opposite end remote from the fuel cell stack.

6. The fuel cell module according to claim 4, wherein the condensed water recovery mechanism includes a first inner ring surface forming a bottom of the second area and a second inner ring surface forming a bottom of the third area; and the bottom surface of the second inner ring surface is higher than the bottom surface of the first inner ring surface.

7. The fuel cell module according to claim 4, wherein the fuel cell module includes a partition plate provided vertically between the second area and the third area; and the condensed water recovery mechanism includes condensed water flow holes provided on a lower side of the partition plate opposite to an upper side thereof where the fuel cell stack is provided.

8. The fuel cell module according to claim 7, wherein the number of the condensed water flow holes is three or more, and the condensed water flow holes are arranged in an annular direction.

9. The fuel cell module according to claim 7, wherein the condensed water flow holes each have an opening diameter of 8 mm or more.

10. The fuel cell module according to claim 1, wherein the fuel cell module is a solid oxide fuel cell module.

11. The fuel cell module according to claim 2, wherein the fuel cell module is a solid oxide fuel cell module.

* * * * *